Figure 1:
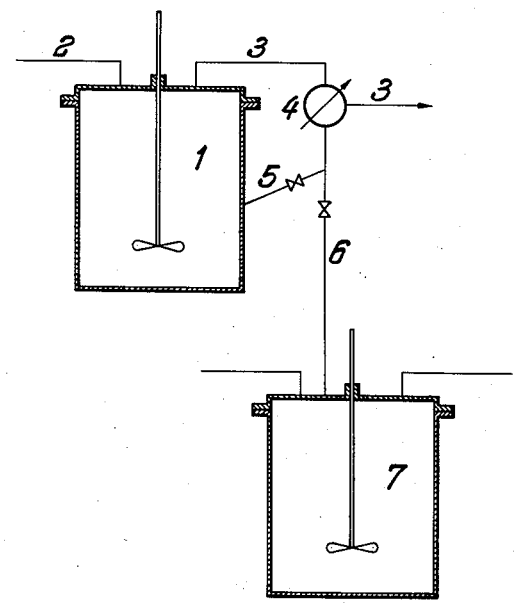

June 27, 1961     K. PETERLEIN     2,990,399
POLYMERIZATION PROCESS
Filed April 16, 1956

Inventor:
Karl Peterlein
By: Michael S. Striker
agt.

United States Patent Office 2,990,399
Patented June 27, 1961

2,990,399
POLYMERIZATION PROCESS
Karl Peterlein, Gladbeck, Germany, assignor to Firma Gelsenberg Benzin Aktiengesellschaft, Gelsenkirchen-Horst, Germany
Filed Apr. 16, 1956, Ser. No. 578,259
Claims priority, application Germany Feb. 4, 1955
7 Claims. (Cl. 260—94.9)

The present invention relates to a polymerizing process, and more particularly to a method of polymerizing olefins or olefin-containing gases to high polymers.

The present application is a continuation-in-part of my copending application Serial No. 562,612, filed January 31, 1956, now Patent No. 2,956,994, entitled "Method of Polymerizing Olefins."

The polymerization of olefins by means of reduced heavy metal compounds such as metal organic compounds at normal pressure, reduced pressure or under extremely high pressures, as described by Karl Ziegler, in Angewandte Chemie, Jahrgang 67 (1955), pages 541–547, when such polymerization is carried out in the normal manner in the presence of suitable organic liquids, which throughout the rest of the specification and claims will be designated as "solvents," has various difficulties connected therewith.

Thus, for example, due to the sensitivity of the catalyst against various impurities, specific conditions must be adjusted concerning the utilized solvent with respect to purity, the boiling range and the composition thereof. Due to the extreme purity requirements, a very careful pre-purification is necessary which in view of the rather large amounts of solvent utilized, is extremely troublesome and expensive.

In the customary execution of the polymerization process in which as solvents primarily hydrocarbons or hydrocarbon mixtures having a boiling point higher than 100° C. were used, a portion of the employed solvent was recovered by filtration or centrifugation of the finished polymerized olefin, and the remainder of the solvent which adhered to the polymerized olefin was removed from the same by distillation, for instance by steam distillation or by other suitable means. This method of recovery of the solvents is cumbersome and furthermore invokes the risk of contaminating the solvent with impurities which like so-called catalyst poisons, will be detrimental to the effectiveness of the catalyst. Such impurities which might be introduced into the solvent during the recovery of the same include for instance the oxygen of the air or water, and it then becomes necessary in separate steps to remove such impurities from the solvent prior to reusing the same. If the solvent is removed from the polymerized olefin by a steam distillation it is in any event necessary to subsequently remove from the solvent the water which is either dissolved or suspended therein.

It is apparent that if it were possible to carry out the polymerization of olefins, such as ethylene, without the use of large amounts of solvents, it would then be possible to avoid or at least to reduce the above set forth difficulties. It has therefore been attempted to achieve dry polymerization of olefins, such as ethylene, with and without carriers for the utilized catalyst complex. However, the results obtained prior to the present invention, have been unsuccessful.

If the dry polymerization is carried out without a carrier, the produced polymerisate precipitates in the form of crusts or skins which form as a coating or incrustation on the walls and other parts of the reaction vessel with which it comes in contact, and because of the non-homogeneous condition thereof, the further working up is extremely difficult. In addition, because of the insulating properties of this covering, the conducting of the heat of the reaction is greatly hindered.

The dry polymerization of the olefins such as ethylenes by the use of an introduced carrier substance for the catalyst involves other difficulties.

Because of the great sensitivity of the utilized catalysts with respect to impurities such as liquids, oxygen, acids or bases, the introduction of any foreign substance into the reaction system in order to serve as a carrier, carries with it the danger of damage or destruction of the activity of the catalysts. This leads in the practice to undesired long induction periods, before the reaction begins, or to the breaking down of the reaction too soon. With respect to the long induction time before the reaction begins, this has an additional disadvantage of requiring the use of relatively large amounts of catalysts which is of course disadvantageous when it is desired to produce products with a low ash content. As a result thereof, the yield by proceeding in this manner is quite low.

It is therefore a primary object of the present invention to provide a method of polymerizing olefins, and particularly ethylenes, or olefin-containing mixtures, which avoids all of the above described difficulties of the known methods of polymerizing olefins by the use of solvents, or by the dry polymerization methods with or without the use of carriers.

It is another object of the present invention to provide a method of polymerizing olefins in the presence of solvents so chosen as to not give cause to the above described difficulties.

It is still another object of the present invention to provide a method of polymerizing olefins by a substantially dry polymerization method, that is in the absence of solvents, by the use of a carrier substance which avoids all of the difficulties present in the use of known carriers for the catalysts.

It is yet another object of the present invention to provide a method of polymerizing olefins and olefin-containing mixtures, and particularly polymerizing ethylenes, whereby the polymerized product is produced in an easily controllable manner in a high state of purity and whereby the production is economical.

Other objects and advantages of the present invention will be apparent from a further reading of the specification and of the appended claims.

With the above and other objects in view, the present invention mainly consists in a method of polymerizing olefins and olefin-containing mixtures, and particularly in polymerizing ethylenes, comprising the steps of polymerizing the olefin in the presence of a catalyst in the further presence of a carrier for the catalyst which carrier for the catalyst is a polymerized olefin which has been polymerized by a solvent polymerization method and from which polymerisate the solvent has been evaporated before the polymerisate is used as a carrier for the catalyst in the dry polymerization according to the present invention.

In another embodiment, the present invention consists in a method of polymerizing olefins, comprising the steps of subjecting an olefin to polymerization in the presence of a polymerization catalyst and a solvent therefor having a boiling point below the reaction temperature of the polymerization so as to form a polymerized olefin portion, removing at least part of the polymerized olefin portion and of the solvent, evaporating the removed part of the solvent and separating the same, reliquefying the separated vaporized solvent, and polymerizing additional olefin in the presence of a polymerization catalyst and of at least a portion of the reliquefied solvent.

In other words, the first described embodiment of the present invention is mainly based upon the use as a carrier for the catalyst of a small amount of freshly produced polymerisate which has been produced for the express purpose of serving as a carrier in a dry polymerization method according to the present invention to be executed in the same system or vessel. This polymerisate which serves as carrier is according to the present invention first produced by the solvent polymerization method mentioned in the second embodiment of the present invention described above and utilizing only a small amount of a low boiling inert solvent which is removed from the reaction vessel after the polymerisate has been formed. The removal of the solvent from the polymerisate after a sufficient amount of polymerisate has been formed to serve as carrier for the catalyst for the further dry polymerization is preferably carried out by distillation, whereby the necessary heat therefor comes from the reaction heat of the polymerization and, if necessary, additional heat may be introduced from without the reaction vessel.

The produced solvent vapors escape from the reaction vessel together with any waste gases or excess ethylene which may be present, and these vapors can by condensation again be liquefied and without further additional purification again be utilized.

A portion of this condensate can, as needed, be reintroduced into the reaction vessel. In this manner and by suitable additions of heat, it is possible to control the removal of the solvent which is needed at the beginning in the usual manner. In general, no outside heating is necessary if the solvent which is utilized is according to the present invention a low boiling solvent which boils at below the maximum reaction temperature of the polymerization reaction. After removal of the organic liquids utilized as solvents at the beginning of the reaction, the polymerization continues in the now dry form without any further breaking off of the polymerization.

It is however also within the scope of the present invention to employ throughout the entire polymerization process a low boiling solvent which is distilled off during the polymerization process, thereafter is condensed and again introduced into the polymerization process. This embodiment of the present invention will be discussed in detail further below.

Referring now again to the embodiment of the present invention according to which the polymerization process is continued in a dry manner, it is necessary for the troublefree course of the further reaction to subject the entire finely divided dispersed polymerisate particles to an intensive stirring in order to obtain a good contact between the same and the gas stream. By selection of the stirring speed it is possible to control the speed of reaction within specific limits. To the extent to which the quantity of the polymerisate increases, or the effect of the catalysts decreases, fresh contact must be supplied in a suitable manner if one does not desire to be limited to a batch operation. The supplying of additional catalysts may be done periodically or continuously, whereby, for example, the components of the catalysts may be supplied separately in concentrated form or dilute in a low boiling solvent, or the entire contact complex which is formed from the components thereof may be supplied as such or also dissolved in a suitable low boiling solvent.

Thus, the method of the present invention may be easily carried out in a continuous manner in which a portion of the polymerisate is drawn off to the extent that new product is formed.

The method of the present invention is carried out utilizing a catalyst consisting of a combination of an organic aluminum compound as reducing agent and a heavy metal compound which is adapted to be reduced by the aluminum compound reducing agent. In the production of the initial small amount of polymerisate by the solvent polymerization method, which polymerisate serves as carrier for the catalyst during the further operation, a solvent consisting of individual hydrocarbons of paraffinic, naphthenic or aromatic nature or mixtures thereof, is used. The solvent is to be free of oxygen, nitrogen or sulfur containing compounds and must also not contain or develop active hydrogen. The boiling point or boiling range of the solvent generally must be between $-35°$ C. and $+90°$ C., however, in accordance with the preferred embodiment of the present invention described further below solvents having a boiling point lower than the maximum temperature of the polymerization reaction are to be used. It is also within the scope of the present invention to apply as solvents halogen derivatives of the above mentioned hydrocarbons provided that the same having a boiling temperature falling within the above described range. The terms "catalyst" and "solvent" used in the appended claims refer to the above defined substances. It is particularly advantageous according to the present invention to utilize as solvent for the initial solvent polymerization or for the entire polymerization if the same is to be executed in the presence of solvents, those organic liquids which can be easily removed from the formed polymerisate, e.g. those organic liquids such as the easily vaporizable light hydrocarbons which under normal conditions are in gaseous form, while under increased pressure under which the same may be put in the process of the present invention are in liquid form. Butane is an example of such an organic liquid. By the use of such substance as butane according to the preferred embodiment of the present invention it is possible after the formation of a sufficient amount of polymerisate by the solvent polymerization method under pressure, to remove the solvent which is liquid only under pressure, by releasing the pressure and thereby vaporizing the solvent.

It should also be noted that although the present invention is discussed mainly with respect to the polymerization of ethylene, the features of the present invention are equally applicable to the polymerization of any of the other olefins which are commonly polymerized for technical purposes.

A great advantage of the present invention lies in the fact that by the formation of the carrier substance in the same reaction vessel in which the first polymerization is carried out in liquid manner, the introduction of foreign substances which are dangerous to the catalyst is eliminated. Thus, it is possible by the application of a small amount of solvent to start the polymerization to obtain a certain start of the reaction and a trouble-free further continuation thereof.

A further advantage of the method of the present invention lies in the fact that according to the present invention it is possible to operate without large amounts of solvent, which in the normal polymerization in the presence of solvents are actually present in amounts far greater than the amount of the produced product. The use of such solvents according to the known processes may introduce impurities which damage the catalyst as well as the final product, since such impurities cannot be completely removed by precleaning of the utilized solvent. It must be noted however that according to the preferred embodiment of the present invention in which a low boiling solvent is reused for subsequent polymerization, the danger of introducing additional impurities is avoided even if the polymerization is continued in the presence of such solvents.

Thus, due to the elimination of impurities according to the method of the present invention, the quantity of catalytic substance required for polymerization reactions according to the present invention is frequently lower than with the customary solvent polymerization methods. This is an evident advantage in the production of products having a low ash content.

The produced fine particle dry polymerisate can be extremely well mixed, like liquids, and can be well distributed by stirring, whereby the proceeding of the reaction and the discharging of the final dry product are greatly facilitated. The final dry product contains only traces, at most, of the solvent and can be directly subjected to a de-ashing process.

According to another preferred embodiment of the present invention the polymerization reaction is executed in the presence of an inert organic solvent which boils within the range of the reaction temperature of the polymerization reaction, and which may easily be removed from the newly formed polymerisate by distilling off, and without being removed from the closed system in which the reaction proceeds. By retaining the vaporized solvent within a closed system the introduction of impurities such as catalyst poisons is prevented. The heat required for distilling off of the solvent is usually provided by the reaction heat of the polymerization process but may, if necessary be augmented by additional heat supplied from the outside. The solvent vapors leave the reaction vessel together with surplus olefins and together with any present waste gases. From this gaseous mixture, the vaporized solvent is again liquefied by condensation. The condensation of the vaporized solvent takes place in a suitable cooling or compression apparatus within the closed reaction system so that again the introduction of catalyst poisons or other impurities is safely prevented. The cooling or compression apparatus is preferably arranged into the waste gas conduit leading from the reaction vessel. The condensed solvent vapors can then be returned as needed into the reaction vessel until the polymerization has been completed or until the polymerization is to be continued as a dry polymerization, and only thereafter, the condensed solvent vapors will be completely removed. By following this process one achieves the further advantage that by suitably choosing the boiling range of the solvent, the reaction temperature in the reaction vessel is adjusted and automatically controlled. The thus recovered solvent can be immediately and without any further purification be used for additional or new polymerization reactions.

The above described preferred process of the present invention can also be executed in a continuous manner by removing from the reaction vessel continuously or periodically a portion of the reaction mass into an intermediate container which is filled with an inert gas such as nitrogen, ethylene or the waste gases of the reaction, and from which the low boiling solvent can be removed in suitable manner by distillation, subsequently condensed and again reintroduced into the reaction vessel, while the polymerisate, thus freed from solvent, can be removed from the intermediary vessel for further processing.

The above described preferred embodiment of the present invention offers the following advantages:

By employing as solvent either an organic low boiling liquid which boils within the range of the reaction temperatures, or a gas which can be liquefied under pressure, it is achieved that the solvent can simply and completely be separated from the polymerized olefins by means of distillation. The distilled solvent, after subsequent liquefaction is completely free of catalyst poisoning impurities, since even such impurities which might have been present in traces in the original solvent have been removed or destroyed during the first use of the solvent in contact with the catalyst in the reaction vessel. Accordingly, the distilled and reliquefied solvent will be completely free of such impurities, since in the closed system in which the reaction, the distillation, and the condensation or liquefaction of the solvent takes place, no introduction of impurities will occur. Consequently the recovered solvent can be reused without further purification. Furthermore, the use of a sufficiently low boiling solvent permits the complete separation of the same from the polymerized olefin by distillation, which could not be achieved by the customary separation for instance by means of centrifuges or suction, since the centrifuged or exhausted polymerized residues still retain considerable quantities of the organic liquid (up to 60% by weight of the polymerisate), which have to be removed by subsequent steam distillation. The fact that according to the present invention a steam distillation is not required is of great advantage for the further processing of the polymerisates.

The novel features which are considered as characteristic for the invention are set forth in particular in the appended claims. The invention itself, however, especially according to a preferred embodiment of the method of operation, and together with additional objects and advantages thereof will be best understood from the following description of specific examples when read in connection with the accompanying drawing, in which:

FIG. 1 is a schematic view of an apparatus in which the present invention may be executed.

Referring now to the drawing, a reaction vessel 1 is shown equipped with an agitator. A conduit 2 is provided for the introduction of a polymerizable olefin such as ethylene into reaction vessel 1. Waste gases, surplus ethylene and evaporated solvent are removed from reaction vessel 1 through conduit 3. Conduit 3 passes through a condenser or cooler 4 in which the evaporated solvent is reliquefied. The still gaseous waste gases and surplus ethylene are removed from the condenser through the continuation of conduit 3, while the liquefied solvent leaves the condenser through conduits 5 or 6. Conduit 5 is used for returning the reliquefied solvent to reaction vessel 1, while conduit 6 is used for introducing the reliquefied solvent into reaction vessel 7 for starting or continuing the polymerization reaction therein.

The following examples are given to further illustrate the present invention, the scope of the invention not however being limited to the specific details of the examples.

Example I 1,000 cc. of pure n-hexane is introduced into a reaction vessel and intensively stirred with the introduction of pure ethylene. After one hour, 3 cc. of triethyl aluminum and 1 cc. of titanium tetrachloride is added. The polymerization begins immediately thereafter, as a result of which the temperature quickly increases to about 65° C. and the solvent is distilled off in the gas stream. By reintroducing a portion of the liquefied distillate, the process is continued that about 50–100 g. of polymerisate is formed, before the solvent is completely removed. Thereupon, additional ethylene is introduced under intensive stirring; thereby the amount of the produced polymerisate increases. By cooling, the reaction temperature is held below 85° C. After eight hours, the experiment was stopped, although if it were continued the reaction could still proceed with the taking up of additional ethylene. At this time it was found that 460 g. of finely divided polymerisate had been formed, which in the usual manner may be further worked up.

Example II 6 cc. of monochlorodiethyl aluminum and 1 cc. of titanium tetrachloride is dissolved by stirring under a nitrogen atmosphere in 250 cc. of a sulfuric acid refined light gasoline having a boiling range between 60–70° C. After one hour it is transferred to a reaction vessel which is provided with a stirrer, the reaction vessel containing 750 cc. of the same gasoline. Pure ethylene is introduced into this charge whereby the polymerization begins at once with increase of temperature to above 60°. The solvent is distilled off with the gas stream and a portion of the condensate formed by condensation of the solvent is again reintroduced into the reaction vessel so that about 50 g. of polymerisate is formed before the solvent is completely removed. The removal of the last traces of the gasoline is carried out by irradiating the vessel with an infra red ray which hastens the evaporation. By the further introduction of ethylene into the now dry charge, the polymerization continues further. After ten hours, 500 g. of polyethylene is obtained.

In general, the amount of polymerisate produced by solvent polymerization needed for starting dry polymerization is at least 5% of the desired production of the polymerisate. The absolute amount must be sufficient to secure effective stirring of the dry product.

The amount of catalyst for effective polymerization ranges between 0.1–10% preferably 0.5–2% in respect to the present polymerisate and must be maintained during proceeding of polymerization.

*Example III*

1 liter of hexane which has been previously distilled over sodium is introduced into a reaction vessel such as indicated in the drawing by reference numeral 1. Reaction vessel 1 has the capacity of 3.5 liters. Thereafter a polymerization catalyst according to Ziegler, consisting of 3 cc. triethyl aluminum and 1 cc. titanium tetrachloride is also introduced into the reaction vessel 1. Into this mixture, pure ethylene is introduced through conduit 2 in a quantity of 60 liters per hour. Polymerization of the ethylene takes place and the reaction temperature rises to the boiling temperature of the hexane i.e. 68° C., thereby causing evaporation of the solvent (hexane). The solvent vapors which leave reaction vessel 1 through conduit 3 together with waste gases, are then condensed in cooler 4 and from there reintroduced into reaction vessel 1 through conduit 5. After 8 hours of continuous polymerization, the reintroduction of the condensed solvent is interrupted and the condensed solvent then introduced in a stream of inert waste gas into the second reaction vessel 7 through conduit 6. In second reaction vessel 7 a second polymerization reaction then is started.

The polymerisate which remained in the first reaction vessel after 8 hours amounted to 480 grams, did not contain any traces of the solvent and was further processed in customary manner.

*Example IV*

1 liter of straight run light gasoline having a boiling range of between 50°–70° C. and being free of catalyst poisoning impurities, is mixed, as described in Example I, with a polymerization catalyst, and into the mixture ethylene is introduced at the rate of 80 liters per hour. Thereby the reaction temperature rises to about 50° C. The gasoline vapors which are carried away together with waste gases and non-polymerized ethylene are condensed in a high efficiency cooling apparatus and reintroduced in liquid form into the reaction vessel 1. After 3 hours reintroduction of gasoline is interrupted and the condensate subsequently formed is stored or used for another polymerization set up. The further separation of the solvent from the polymerized ethylene formed in reaction vessel 1 by distillation is furthered by employing heat from the outside by means of a infra red radiator. The solvent which was thus recovered by condensation of the solvent vapors can be reused for another polymerization reaction without any purification. As solvents e.g. the following substances or mixtures thereof may be used:

Propane
Butane
Isobutane
Pentane and isomeric pentanes
Hexane and isomeric hexanes
Heptane and isomeric heptanes
Cyclopropane and alkylsubstituted cyclopropanes
Cyclobutane and alkylsubstituted cyclobutanes
Ccylopentane and alkylsubstituted cyclopentanes
Cyclohexane and alkylsubstituted cyclohexanes
Benzene
Refined light petroleum gases
Light petroleum distillates or other refinery products having a final boiling point up to about 230° F.
Alkylhalogenides as chloromethane or tetrachloromethane.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of polymerizing ethylene, comprising the steps of subjecting ethylene to polymerization in the presence of a polymerization catalyst therefor including an organic aluminum compound and a heavy metal compound and a solvent therefor having a boiling point below the reaction temperature of said polymerization the same thus being carried out under boiling of said solvent so as to form a solid polymerized ethylene portion simultaneously evaporating at least a portion of said boiling solvent and removing the same; reliquefying said removed vaporized solvent thereby forming a pure reliquefied solvent; reintroducing at least a portion of said pure reliquefied solvent; and polymerizing additional ethylene in the presence of said polymerization catalyst and of said reintroduced solvent.

2. A method of polymerizing ethylene, comprising the steps of subjecting ethylene to polymerization at a predetermined pressure and in the presence of a polymerization catalyst therefor including an organic aluminum compound and a heavy metal compound and a solvent therefor having at said predetermined pressure a boiling point below the reaction temperature of said polymerization the same thus being carried out under boiling of said solvent so as to form a solid polymerized ethylene portion simultaneously evaporating at least a portion of said boiling solvent and removing the same; reliquefying said removed vaporized solvent thereby forming a pure reliquefied solvent; reintroducing at least a portion of said pure reliquefied solvent; and polymerizing additional ethylene in the presence of said polymerization catalyst and of said reintroduced solvent.

3. A method of polymerizing ethylene, comprising the steps of subjecting ethylene to polymerization in the presence of a polymerization catalyst therefor including an organic aluminum compound and a heavy metal compound and a solvent therefor having a boiling point below the reaction temperature of said polymerization the same thus being carried out under boiling of said solvent so as to form a solid polymerized olefin portion simultaneously evaporating at least a portion of said boiling solvent and removing the same; condensing said removed vaporized solvent thereby forming a pure condensed solvent; reintroducing at least a portion of said pure condensed solvent; and polymerizing additional ethylene in the presense of said polymerization catalyst and of said reintroduced solvent.

4. A method of polymerizing ethylene, comprising the steps of subjecting ethylene to polymerization in the presence of a polymerization catalyst therefore including an organic aluminum compound and a heavy metal compound and a hydrocarbon solvent therefor having a boiling point below the reaction temperature of said polymerization the same thus being carried out under boiling of said solvent so as to form a solid polymerized ethylene portion simultaneously evaporating at least a portion of said boiling solvent and removing the same; reliquefying said removed vaporized solvent thereby forming a pure reliquefied solvent; reintroducing at least a portion of said pure reliquefied solvent; and polymerizing additional ethylene in the presence of said polymerization catalyst and of said reintroduced solvent.

5. A method of polymerizing ethylene, comprising the steps of subjecting ethylene to polymerization in the presence of a polymerization catalyst therefore including an organic aluminum compound and a heavy metal compound and a solvent therefor having a boiling point below the reaction temperature of said polymerization the same thus being carried out under boiling of said solvent so as to form a solid polymerized ethylene portion simultaneously removing at least part of said polymerized ethylene portion and of said solvent; evaporating said removed part of said solvent and separating the same from said removed polymerized ethylene portion; reliquefying said separated vaporized solvent thereby forming a pure reliquefied solvent; and polymerizing additional ethylene in the presence of said polymerization catalyst and of at least a portion of said pure reliquefied solvent.

6. In a method of polymerizing ethylene, the steps of subjecting ethylene to polymerization in the presence of a polymerization catalyst therefor including an organic aluminum compound and a heavy metal compound and a solvent therefor containing small quantities of impurities and having a boiling point within the range of the reaction temperature of said polymerization the same thus being caried out under boiling of said solvent so as to form a solid polymerized ethylene portion simultaneously removing at least part of said polymerized ethylene portion and of said solvent; evaporating said removed part of said solvent and separating the same from said removed polymerized ethylene portion; reliquefying said separated vaporized solvent, thereby obtaining a solvent free of said impurities; and polymerizing additional ethylene in the presence of a polymerization catalyst and of said reliquefied solvent.

7. A method of polymerizing ethylene, comprising the steps of subjecting ethylene to polymerization in the presence of a polymerization catalyst therefor including an organic aluminum compound and a heavy metal compound and of a solvent therefor having a boiling point within the range of the reaction temperature of said polymerization the same thus being carried out under boiling of said solvent so as to form a solid polymerized ethylene portion and simultaneously evaporating at least a portion of said boiling solvent; removing the thus-vaporized solvent; reliquefying said removed vaporized solvent thereby forming a reliquefied solvent free of impurities; reintroducing at least a portion of said pure reliquefied solvent; and polymerizing additional ethylene in the presence of said polymerization catalyst and of said reintroduced pure solvent.

References Cited in the file of this patent

UNITED STATES PATENTS

| | | |
|---|---|---|
| 2,484,384 | Levine et al. | Oct. 11, 1949 |
| 2,530,144 | Bannon | Nov. 14, 1950 |
| 2,691,647 | Field et al. | Oct. 12, 1954 |
| 2,692,259 | Peters | Oct. 19, 1954 |
| 2,825,721 | Hogan et al. | Mar. 4, 1958 |
| 2,827,447 | Nowlin et al. | Mar. 18, 1958 |
| 2,862,917 | Anderson et al. | Dec. 2, 1958 |
| 2,879,263 | Anderson et al. | Mar. 24, 1959 |
| 2,885,389 | Schappert | May 5, 1959 |